United States Patent
Yin et al.

(10) Patent No.: US 7,609,454 B1
(45) Date of Patent: Oct. 27, 2009

(54) IMAGING LENS SYSTEM WITH HIGH RESOLUTION AND COMPACT SIZE

(75) Inventors: Chun-Yi Yin, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/277,256

(22) Filed: Nov. 24, 2008

(30) Foreign Application Priority Data

Oct. 14, 2008 (CN) .................. 2008 1 0304929

(51) Int. Cl.
*G02B 1/03* (2006.01)
*G02B 17/00* (2006.01)
*G02B 9/34* (2006.01)

(52) U.S. Cl. .............. 359/648; 359/649; 359/650; 359/651; 359/715; 359/740; 359/773

(58) Field of Classification Search ......... 359/648–651, 359/715, 740, 773
See application file for complete search history.

(56) References Cited

U.S. PATENT DOCUMENTS

| | | | | |
|---|---|---|---|---|
| 7,355,801 B2* | 4/2008 | Chen et al. | .................. | 359/773 |
| 7,408,723 B1* | 8/2008 | Lin | ............................. | 359/715 |
| 7,443,611 B2* | 10/2008 | Shinohara | .................... | 359/772 |
| 7,453,654 B2* | 11/2008 | Shinohara, Yoshikazu | .. | 359/773 |
| 7,535,659 B2* | 5/2009 | Sano | .......................... | 359/773 |
| 2009/0009889 A1* | 1/2009 | Teraoka et al. | .............. | 359/773 |
| 2009/0015944 A1* | 1/2009 | Taniyama | .................... | 359/773 |
| 2009/0059392 A1* | 3/2009 | Sano | .......................... | 359/715 |

\* cited by examiner

*Primary Examiner*—Evelyn A. Lester
(74) *Attorney, Agent, or Firm*—Zhigang Ma

(57) ABSTRACT

An imaging lens includes, in the order from the object side to the image side, a first lens of positive refraction power, a second lens of negative refraction power, a third lens of positive refraction power, and a fourth lens of negative refraction power. The imaging lens satisfies the formulae (1) $1<T/F<1.4$; (2) $R3/F>4$; and (3) $S1/S2>3$, where T is the overall length of the imaging lens, F is the focal length of the imaging lens, R3 is the radius of curvature of the object-side surface of the second lens, S1 is the vertical distance from the edge to the center of the image-side surface of the third lens, and S2 is the horizontal distance from the edge to the center of the image-side surface of the third lens.

18 Claims, 7 Drawing Sheets

IMAGING LENS SYSTEM WITH HIGH RESOLUTION AND COMPACT SIZE

BACKGROUND

1. Technical Field

The disclosure relates to imaging lenses and, particularly, to an imaging lens system providing high resolution with reduced overall length.

2. Description of Related Art

To optimize image quality, small camera modules for use in thin devices, such as mobile phones, or personal digital assistant (PDA), must employ imaging lenses with high resolution but minimal overall length (the distance between the object-side surface of the imaging lens and the image plane of the camera module). Factors affecting both the resolution and the overall length of the imaging lens, such as the number and positions of lenses employed, the optical power distribution of the employed lenses, and the shape of each employed lens, complicate attempts to increase available resolution and shorten the imaging lenses. For example, reducing the number of lenses can reduce the overall length of the imaging lens, but resolution will suffer. Conversely, increasing the number of lenses can increase resolution, but also increases overall length of the imaging lens.

Therefore, it is desirable to provide an imaging lens system which can overcome the described limitations.

BRIEF DESCRIPTION OF THE DRAWINGS

Many aspects of the imaging lens system should be better understood with reference to the following drawings. The components in the drawings are not necessarily drawn to scale, the emphasis instead being placed upon clearly illustrating the principles of the present imaging lens system. Moreover, in the drawings, like reference numerals designate corresponding parts throughout the several views.

DETAILED DESCRIPTION OF THE EMBODIMENTS

Embodiments of the present imaging lens system will now be described in detail with references to the drawings.

Figure 1:
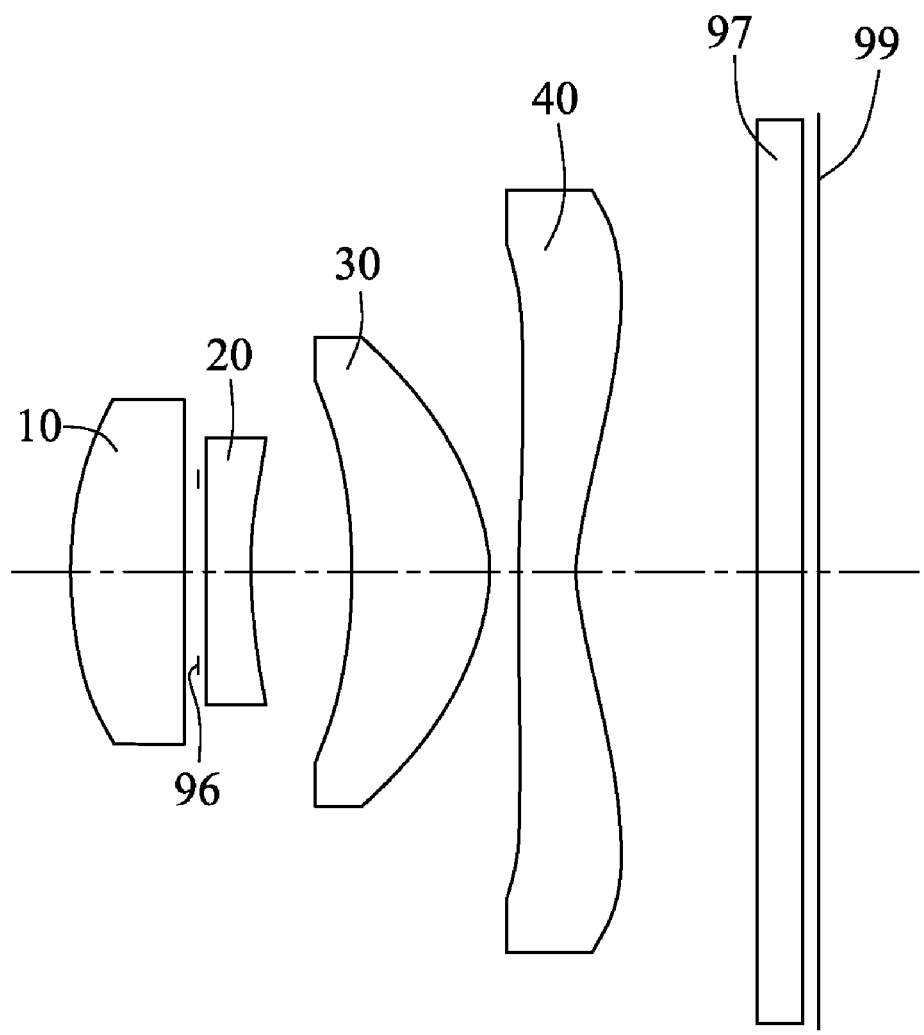
FIG. 1 is a schematic view of an imaging lens in accordance with a first exemplary embodiment.

Referring to FIG. 1, the imaging lens system 100, according to a first exemplary embodiment, includes, in the order from the object side to the image side thereof, a first lens 10, a second lens 20, a third lens 30, and a fourth lens 40. The first lens 10 and the third lens 30 provide positive refraction, and the second lens 20 and the fourth lens 40 provide negative refraction. The first lens 10 is crescent-shaped, convex to the object side and the third lens 30 is also crescent-shaped, and convex to the image side. The imaging lens system 100 satisfies the formulae:

$$1 < T/F \leq 1.4 \tag{1}$$

$$R3/F > 4, \text{ and} \tag{2}$$

$$S1/S2 > 3 \tag{3}$$

where T is the overall length of the imaging lens system 100, F is the effective focal length of the imaging lens system 100, R3 is the radius of curvature of the object side surface of the second lens 20, S1 is the half height of the of the image-side surface of the third lens 30, and S2 is the width of the image-side surface of the third lens 30 on the optical axis of the imaging lens 100.

Formula (1) controls the refraction power of the first lens 10 to obtain a desirably reduced overall length of the imaging lens system 100 and to control aberrations occurring therein within an acceptable range. $T/F \leq 1.4$ allows reduction of the overall length of the imaging lens system 100. However, shortening the overall length of the imaging lens system 100 can cause aberrations, especially spherical aberrations. Thus, $T/F > 1$ is added to limit aberrations within the acceptable range.

Formula (2) controls the refraction power of the object-side surface of the second lens 20 to correct aberrations occurring in the imaging lens system 100, especially spherical aberration, field curvature, and distortion.

Formula (3) limits the curvature of the object-side surface of the third lens 30, thereby binding the ratio of the refraction power of the third lens 30 to the effective refraction power of the imaging lens system 100. This reduces distortion in the imaging lens system 100.

Ideally, the imaging lens system 100 further satisfies the formula: (4) D23>D2, where D2 is the thickness of the second lens 20 along the optical axis of the imaging lens system 100 and D23 is the distance between the second lens 20 and the third lens 30 along the optical axis of the imaging lens system 100. Formula (4) reduces eccentricity error to enhance yield.

Imaging lens 100 also satisfies the formula: (5) R5<R6<0, where R5 is the radius of curvature of the object-side surface of the third lens 30, and R6 is the radius of curvature of the image-side surface of the third lens 30. This formula (5) assists in reducing aberrations, especially field curvature and distortion.

The imaging lens system 100 further includes an aperture stop 96 positioned between the first lens 10 and the second lens 20 to reduce the amount of light flux entering the imaging lens system 100. Namely, the aperture stop 96 blocks off-axis certain light rays entering the imaging lens system 100 to limit field curvature and distortion, the off-axis light rays being a major contributor to field curvature and distortion. Also, positioning the aperture stop 96 between the first lens 10 and the second lens 20 is beneficial in reducing the overall length T of the imaging lens system 100.

To correct chromatic aberration in the imaging lens system 100, the imaging lens system 100 further satisfies the formula:

$$Vd1 > 55 \text{ and } Vd2 < 35 \tag{6}$$

where Vd1 is the Abbe number of the first lens 10 and Vd2 is the Abbe number of the second lens 20.

The four lenses 10, 20, 30, 40 can be made of plastic, to reduce costs, and all have two non-spherical surfaces (i.e., the non-spherical object-side surface and the non-spherical image-side surface) to efficiently correct aberration. The non-spherical surface is shaped according to the formula:

$$x = \frac{ch^2}{1 + \sqrt{1 - (k+1)c^2h^2}} + \sum A_i h^i,$$

where h is a height from the optical axis of the imaging lens system 100 to the non-spherical surface, c is a vertex curvature, k is a conic constant, and Ai are i-th order correction coefficients of the non-spherical surfaces.

Detailed examples of the imaging lens system 100 are given below in company with FIGS. 2-7, but it should be noted that the imaging lens system 100 is not limited by these examples. Listed below are the symbols used in these detailed examples:

$F_{No}$: F number;
2ω: field angle;
R: radius of curvature;
d: distance between surfaces on the optical axis of the imaging lens 100;
Nd: refractive index of lens; and
Vd: Abbe constant.

When capturing an image, incident light enters the imaging lens system 100, sequentially transmits through four lenses 10, 20, 30, 40, a cover glass 97, and is finally focused onto the image plane 99 to form a visual image.

EXAMPLE 1

Tables 1, 2 show the lens data of Example 1, wherein F=3.79 mm, $F_{No}$=2.80, and 2ω=61.69°.

TABLE 1

| Surface | R (mm) | d (mm) | Nd | Vd |
| --- | --- | --- | --- | --- |
| Object-side surface of the first lens 10 | 1.659 | 0.749 | 1.543 | 56.8 |
| Image-side surface of the first lens 10 | 26.261 | 0.05 | — | — |
| Object-side surface of the second lens 20 | 22.155 | 0.30 | 1.63 | 23.41 |
| Image-side surface of the second lens 20 | 2.716 | 0.664 | — | — |
| Object-side surface of the third lens 30 | −2.432 | 0.913 | 1.531 | 55.754 |
| Image-side surface of the third lens 30 | −0.753 | 0.193 | — | — |
| Object-side surface of the fourth lens 40 | 7.240 | 0.382 | 1.531 | 55.754 |

TABLE 1-continued

| Surface | R (mm) | d (mm) | Nd | Vd |
| --- | --- | --- | --- | --- |
| Image-side surface of the fourth lens 40 | 0.922 | 1.196 | — | — |
| Object-side surface of the cover glass 97 | infinite | 0.300 | 1.517 | 64.167 |
| Image-side surface of the cover glass 97 | infinite | 0.100 | — | — |
| Imaging plane 99 | infinite | — | — | — |

TABLE 2

| Surface | Non-spherical coefficient |
| --- | --- |
| Object-side surface of the first lens 10 | k = −0.711037; $A_4$ = 0.026673; $A_6$ = 0.050671; $A_8$ = −0.117008; $A_{10}$ = 0.175503; $A_{12}$ = −0.109353 |
| Image-side surface of the first lens 10 | k = 0; $A_4$ = 0.021435; $A_6$ = −0.057658; $A_8$ = −0.089793; $A_{10}$ = −0.181136; $A_{12}$ = 0.309843 |
| Object-side surface of the second lens 20 | k = 0; $A_4$ = −0.006498237; $A_6$ = −0.20369; $A_8$ = −0.016765; $A_{10}$ = −0.090313; $A_{12}$ = −0.023541 |
| Image-side surface of the second lens 20 | k = 2.221543; $A_4$ = 0.037324; $A_6$ = −0.082739; $A_8$ = −0.050173; $A_{10}$ = 0.121791; $A_{12}$ = −0.063044 |
| Object-side surface of the third lens 30 | k = −2.210704; $A_4$ = −0.057421; $A_6$ = −0.019648; $A_8$ = −0.054084; $A_{10}$ = 0.121791; $A_{12}$ = −0.037866 |
| Image-side surface of the third lens 30 | k = −3.157556; $A_4$ = −0.19349; $A_6$ = 0.105331; $A_8$ = −0.065756; $A_{10}$ = 0.017755; $A_{12}$ = 0.0003429824 |
| Object-side surface of the fourth lens 40 | k = 1.65137; $A_4$ = −0.068743; $A_6$ = 0.024082; $A_8$ = −0.002920126; $A_{10}$ = −0.000752; $A_{12}$ = 0.0001240641 |
| Image-side surface of the fourth lens 40 | k = −6.750171; $A_4$ = −0.066547; $A_6$ = 0.02295; $A_8$ = −0.005801039; $A_{10}$ = 0.000688; $A_{12}$ = −0.0004807394 |

Figure 2:
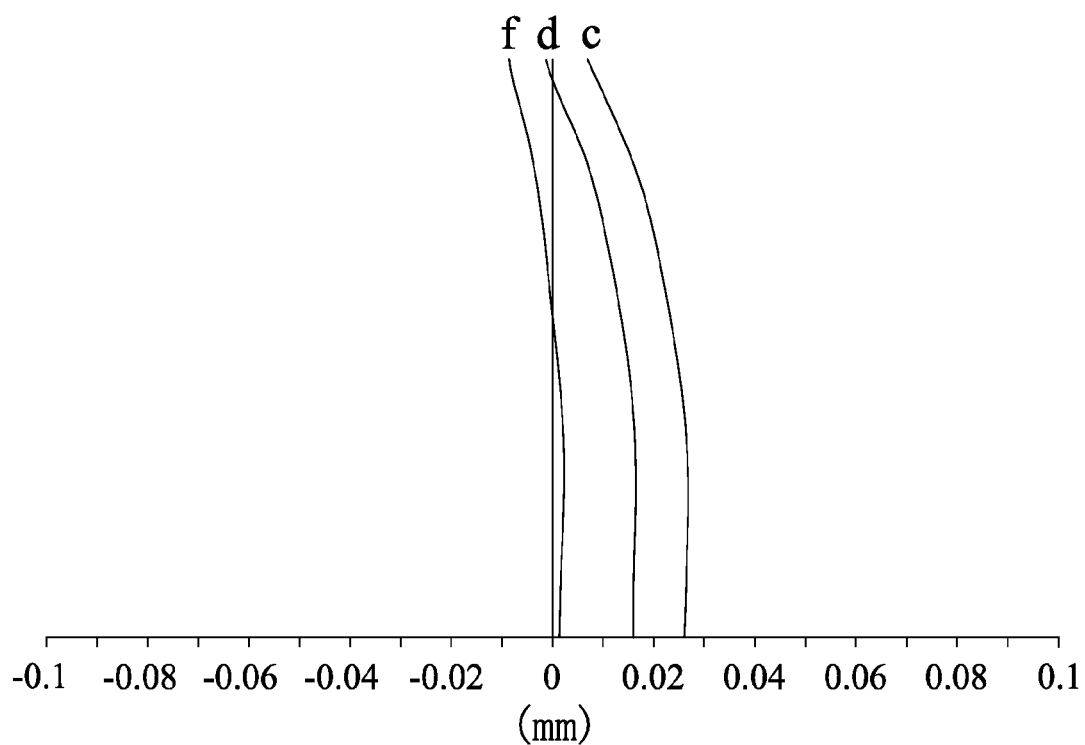
FIG. 2 is a spherical aberration diagram of the imaging lens system, according to the first exemplary embodiment.
Figure 3:
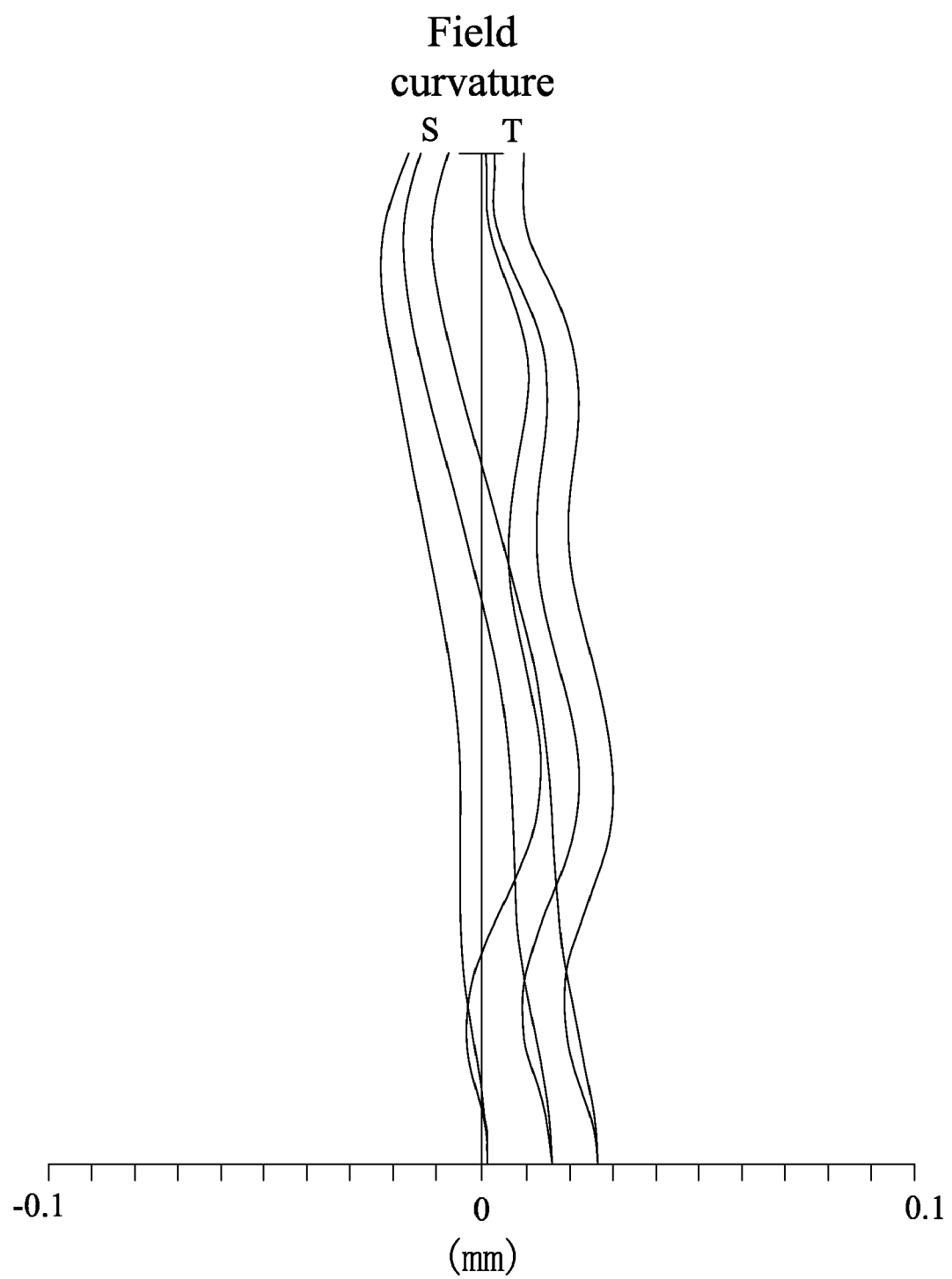
FIG. 3 is a field curvature diagram of the imaging lens system, according to the first exemplary embodiment.
Figure 4:
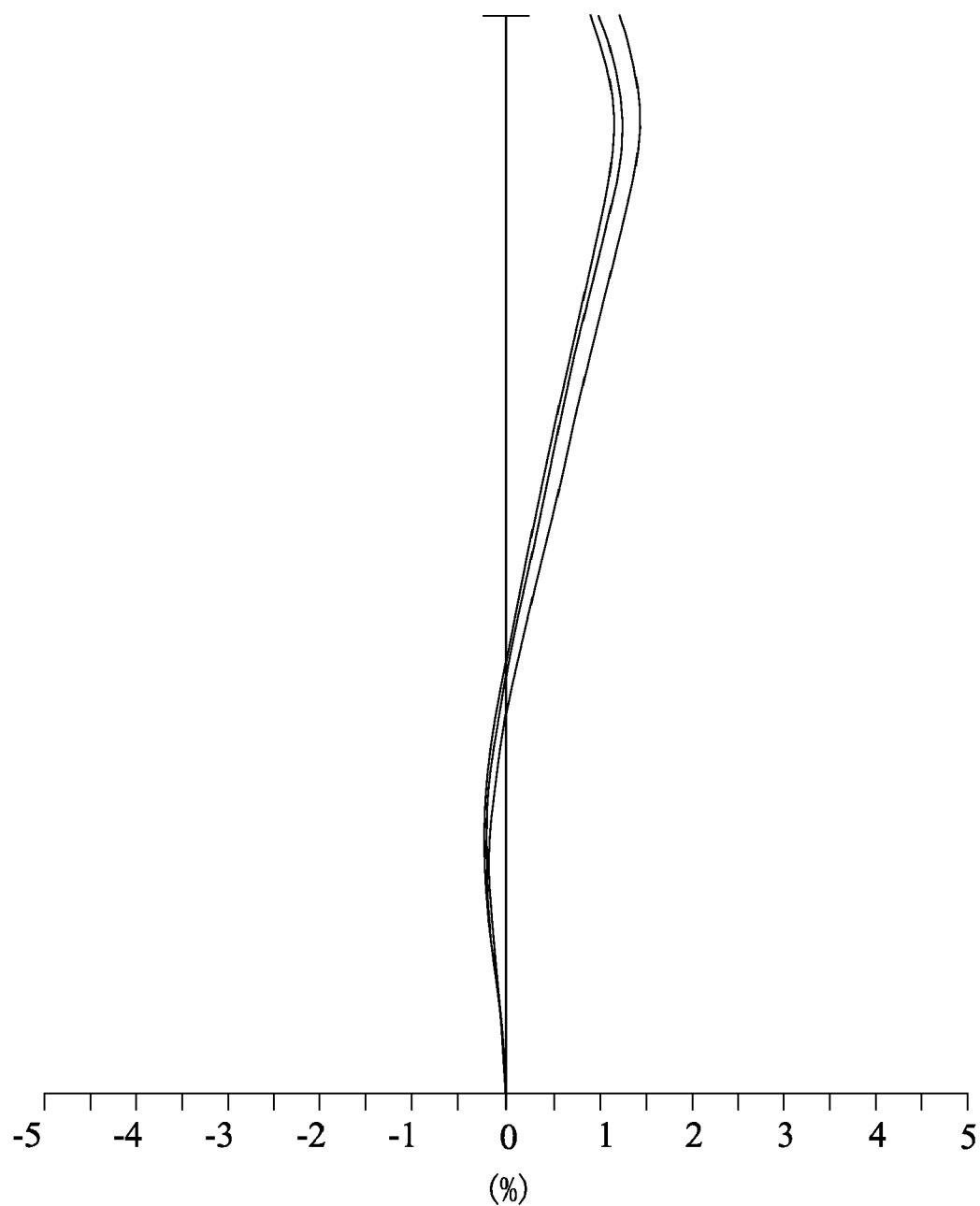
FIG. 4 is a distortion diagram of the imaging lens system, according to the first exemplary embodiment.

As illustrated in FIG. 2, the curves f, d, and c are respective spherical aberration characteristic curves of f light (wavelength: 435.8 nm), d light (587.6 nm), and c light (656.3 nm) occurring in the imaging lens system 100 of Example 1. Obviously, spherical aberration occurring in imaging lens system 100 of Example 1 is in a range of: −0.03 mm~0.03 mm. In FIG. 3, the curves T, S are the tangential field curvature curve and the sagittal field curvature curve respectively. Clearly, field curvature occurring in the imaging lens system 100 of Example 1 is limited to a range of: −0.03 mm~0.03 mm. In FIG. 4, distortion occurring in the imaging lens system 100 of Example 1 is limited within the range of: −2.0%~2.0%.

EXAMPLE 2

Tables 3, 4 show the lens data of EXAMPLE 2, wherein F=3.70 mm, $F_{No}$=2.80, and 2ω=62.85°.

TABLE 3

| Surface | R (mm) | d (mm) | Nd | Vd |
| --- | --- | --- | --- | --- |
| Object-side surface of the first lens 10 | 1.649 | 0.752 | 1.543 | 56.800 |
| Image-side surface of the first lens 10 | 16.212 | 0.050 | — | — |
| Object-side surface of the second lens 20 | 17.445 | 0.300 | 1.632 | 23.415 |
| Image-side surface of the second lens 20 | 2.509 | 0.517 | — | — |
| Object-side surface of the third lens 30 | −3.794 | 1.131 | 1.531 | 55.754 |
| Image-side surface of the third lens 30 | −0.784 | 0.313 | — | — |
| Object-side surface of the fourth lens 40 | −13.740 | 0.347 | 1.531 | 55.754 |
| Image-side surface of the fourth lens 40 | 1.064 | 1.000 | — | — |

TABLE 3-continued

| Surface | R (mm) | d (mm) | Nd | Vd |
|---|---|---|---|---|
| Object-side surface of the cover glass 97 | infinite | 0.300 | 1.517 | 64.167 |
| Image-side surface of the cover glass 97 | infinite | 0.100 | — | — |
| Imaging plane 99 | infinite | — | — | — |

TABLE 4

| Surface | Non-spherical coefficient |
|---|---|
| Object-side surface of the first lens 10 | $k = -0.642103$; $A_4 = 0.029013$; $A_6 = 0.048436$; $A_8 = -0.11167$; $A_{10} = 0.169316$; $A_{12} = -0.108157$ |
| Image-side surface of the first lens 10 | $k = 0$; $A_4 = 0.0085050557$; $A_6 = -0.041365$; $A_8 = -0.089503$; $A_{10} = -0.271382$; $A_{12} = 0.434857$ |
| Object-side surface of the second lens 20 | $k = 0$; $A_4 = -0.044795$; $A_6 = -0.251415$; $A_8 = 0.160935$; $A_{10} = -0.417486$; $A_{12} = -0.023541$ |
| Image-side surface of the second lens 20 | $k = 1.284971$; $A_4 = 0.027151$; $A_6 = -0.071455$; $A_8 = -0.057546$; $A_{10} = 0.174025$; $A_{12} = 0.123373$ |
| Object-side surface of the third lens 30 | $k = -3.177398$; $A_4 = -0.046025$; $A_6 = 0.029007$; $A_8 = -0.063572$; $A_{10} = 0.076952$; $A_{12} = -0.024273$ |
| Image-side surface of the third lens 30 | $k = -2.973783$; $A_4 = -0.18842$; $A_6 = 0.10073$; $A_8 = -0.063354$; $A_{10} = 0.015902$; $A_{12} = 0.003685201$ |
| Object-side surface of the fourth lens 40 | $k = 0$; $A_4 = -0.054677$; $A_6 = 0.020108$; $A_8 = -0.003179381$; $A_{10} = -0.000981$; $A_{12} = 0.00003168462$ |
| Image-side surface of the fourth lens 40 | $k = -7.772631$; $A_4 = -0.068916$; $A_6 = 0.025789$; $A_8 = -0.006742341$; $A_{10} = 0.000702$; $A_{12} = -0.00004912166$ |

Figure 5:
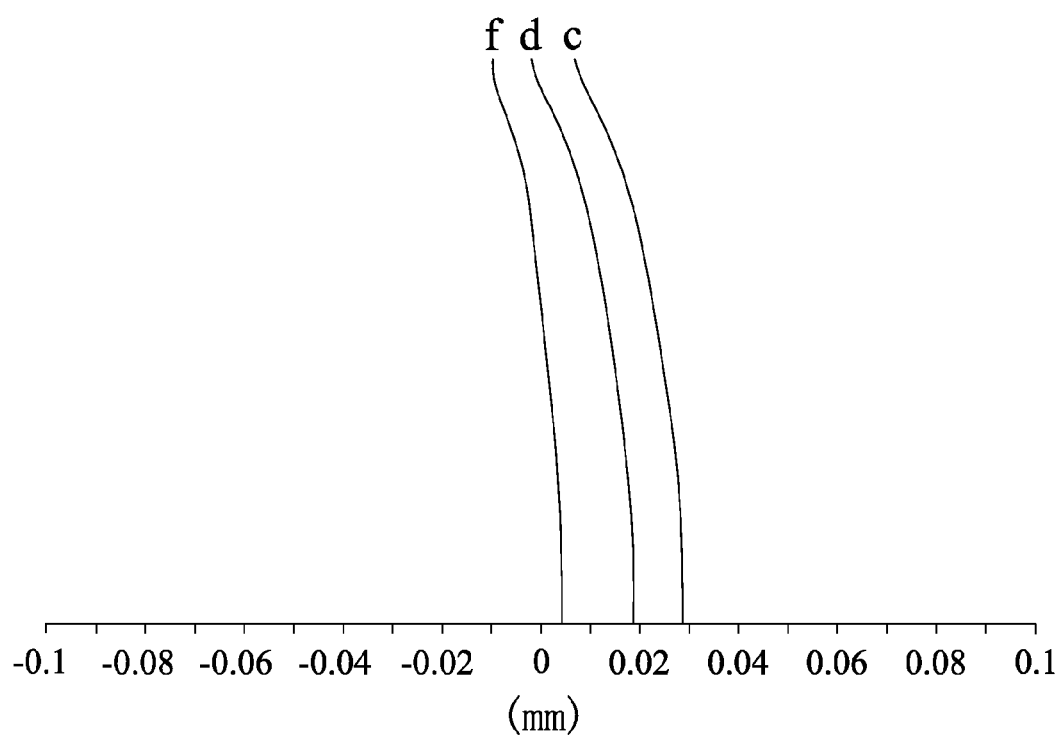
FIG. 5 is a spherical aberration diagram of the imaging lens system, according to a second exemplary embodiment.
Figure 6:
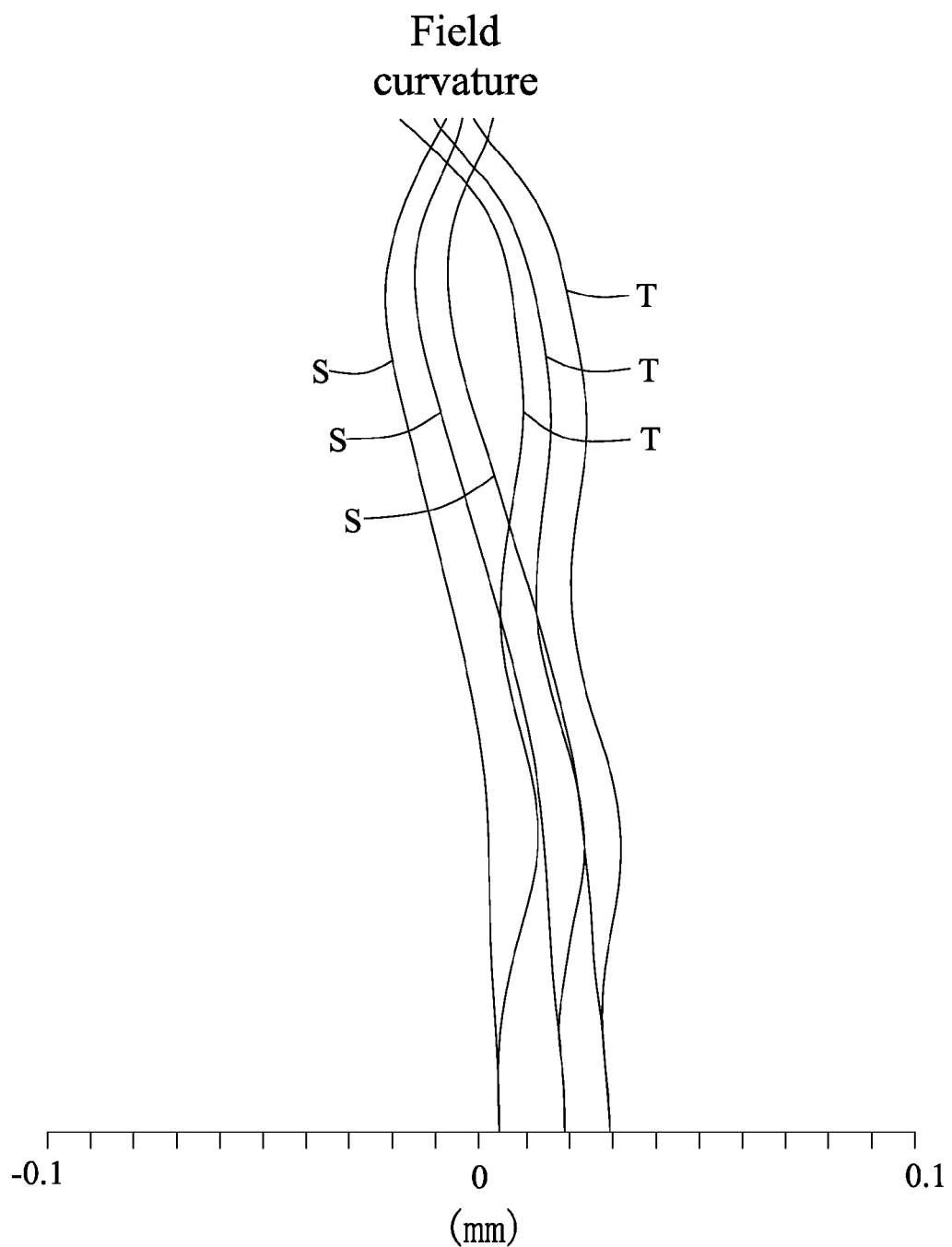
FIG. 6 is a field curvature diagram of the imaging lens system, according to the second exemplary embodiment.
Figure 7:
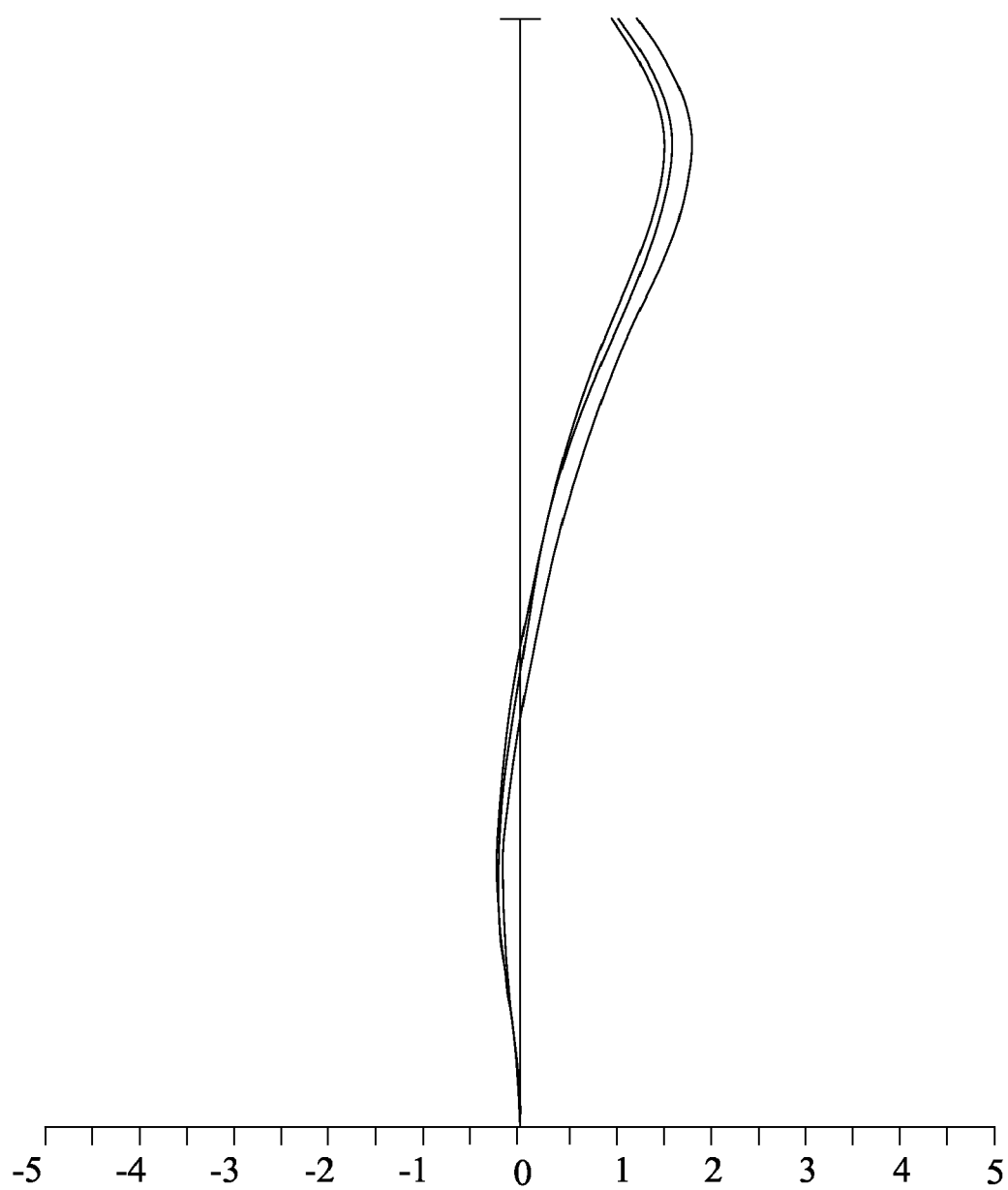
FIG. 7 is a distortion diagram of the imaging lens system, according to the second exemplary embodiment.

As illustrated in FIG. 5, spherical aberration occurring in imaging lens system 100 of Example 2 is in a range of: −0.03 mm~0.03 mm. As shown in FIG. 6, field curvature occurring in the imaging lens system 100 of Example 2 is limited to a range of: −0.03 mm~0.03 mm. In FIG. 7, distortion occurring in the imaging lens system 100 of Example 2 is limited to be within the range of: −2.0%~2.0%.

In all, in Example 1-2, though the overall length of the imaging lens system 100 is reduced, the resolution is enhanced and even improved, since aberrations controlled/corrected within an acceptable range.

It will be understood that the above particular embodiments and methods are shown and described by way of illustration only. The principles and the features of the disclosure may be employed in various and numerous embodiment thereof without departing from the scope of the invention as claimed. The above-described embodiments illustrate the scope of the invention but do not restrict the scope of the invention.

What is claimed is:

1. An imaging lens comprising, in the order from the object side to the image side thereof, a first lens of positive refraction power, a second lens of negative refraction power, a third lens of positive refraction power, and a fourth lens of negative refraction power; the imaging lens satisfying the formulae:

$$1 < T/F < 1.4;$$

$$R3/F > 4; \text{ and}$$

$$S1/S2 > 3,$$

wherein T is the overall length of the imaging lens, F is the focal length of the imaging lens, R3 is the radius of curvature of the object-side surface of the second lens, S1 is the vertical distance from the edge to the center of the image-side surface of the third lens, and S2 is the horizontal distance from the edge to the center of the image-side surface of the third lens.

2. The imaging lens as claimed in claim 1, wherein the first, second, third and fourth lenses are made of plastic.

3. The imaging lens as claimed in claim 1, wherein the imaging lens further satisfies the formula: D23>D2, where D2 is the thickness of the second lens along the optical axis of the imaging lens and D23 is the distance between the second lens and the third lens along the optical axis of the imaging lens.

4. The imaging lens as claimed in claim 1, wherein the imaging lens further satisfies the formula:

$$R5 < R6 < 0,$$

wherein R5 is the radius of curvature of the object-side surface of the third lens and R6 is the radius of curvature of the image-side surface of the third lens.

5. The imaging lens as claimed in claim 1, wherein the imaging lens further comprises an aperture stop disposed between the first lens and the second lens.

6. The imaging lens as claimed in claim 1, wherein the imaging lens further satisfies the formulae:

$$Vd1 > 55; \text{ and}$$

$$Vd2 < 35,$$

wherein Vd1 is the Abbe number of the first lens and Vd2 is the Abbe number of the second lens.

7. The imaging lens as claimed in claim 1, wherein the first, second, third and fourth lenses are non-spherical lenses.

8. The imaging lens as claimed in claim 1, wherein the first lens is crescent-shaped and convex to the object side.

9. The imaging lens as claimed in claim 1, wherein the third lens is crescent-shaped and convex to the image side.

10. An imaging lens comprising, in the order from the object side to the image side:
   a first lens having a positive refraction power;
   a second lens having a negative refraction power;
   an aperture stop positioned between the first lens and the second lens;
   a third lens having a positive refraction power; and
   a fourth lens having negative refraction power, wherein the imaging lens satisfies the conditions:

$$1 < T/F < 1.4;$$

$$R3/F > 4; \text{ and}$$

$$S1/S2 > 3;$$

wherein T is the overall length of the imaging lens, F is the focal length of the imaging lens, R3 is the radius of curvature of the object-side surface of the second lens, S1 is the vertical distance from the edge to the center of the image-side surface of the third lens, and S2 is the horizontal distance from the edge to the center of the image-side surface of the third lens.

11. The imaging lens as claimed in claim 10, wherein the first, second, third and fourth lenses are made of plastic.

12. The imaging lens as claimed in claim 11, wherein the imaging lens further satisfies the formula:

$$D23 > D2,$$

wherein D2 is the thickness of the second lens along the optical axis of the imaging lens and D23 is the distance between the second lens and the third lens along the optical axis of the imaging lens.

13. The imaging lens as claimed in claim 11, wherein the imaging lens further satisfies the formula:

$$R5 < R6 < 0,$$

wherein R5 is the radius of curvature of the object-side surface of the third lens, and R6 is the radius of curvature of the image-side surface of the third lens.

14. The imaging lens as claimed in claim 11, wherein the imaging lens further comprises an aperture stop disposed between the first lens and the second lens.

15. The imaging lens as claimed in claim 11, wherein the imaging lens further satisfies the formulae:

$$Vd1 > 55; \text{ and}$$

$$Vd2 < 35,$$

wherein Vd1 is the Abbe number of the first lens and Vd2 is the Abbe number of the second lens.

16. The imaging lens as claimed in claim 11, wherein the first, second, third and fourth lenses are non-spherical.

17. The imaging lens as claimed in claim 11, wherein the first lens is crescent-shaped and convex to the object side.

18. The imaging lens as claimed in claim 11, wherein the third lens is crescent-shaped and convex to the image side.

* * * * *